(12) United States Patent
Vazquez et al.

(10) Patent No.: US 11,396,868 B2
(45) Date of Patent: Jul. 26, 2022

(54) LINEAR ACTUATOR PUMPING SYSTEM

(71) Applicant: Schaeffler Technologies AG & Co. KG, Herzogenaurach (DE)

(72) Inventors: Andre Vazquez, Fort Mill, SC (US);
Craig Hooker, Indian Land, SC (US);
Michael White, Lake Wylie, SC (US);
Michael Conlin, Rock Hill, SC (US);
Eric Ovendorf, Weddington, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 60 days.

(21) Appl. No.: 16/812,934

(22) Filed: Mar. 9, 2020

(65) Prior Publication Data

US 2021/0277880 A1    Sep. 9, 2021

(51) Int. Cl.

| F04B 39/06 | (2006.01) |
| F04B 27/02 | (2006.01) |
| F04B 35/04 | (2006.01) |
| F04B 53/18 | (2006.01) |
| F04B 53/14 | (2006.01) |
| F04B 53/02 | (2006.01) |
| F04B 39/02 | (2006.01) |
| F04B 47/02 | (2006.01) |
| H02K 35/04 | (2006.01) |

(52) U.S. Cl.
CPC ............ *F04B 39/06* (2013.01); *F04B 27/02* (2013.01); *F04B 35/04* (2013.01); *F04B 39/02* (2013.01); *F04B 39/0292* (2013.01); *F04B 53/02* (2013.01); *F04B 53/143* (2013.01); *F04B 53/18* (2013.01); *F04B 47/02* (2013.01); *H02K 35/04* (2013.01)

(58) Field of Classification Search
CPC ...... F04B 39/06; F04B 39/0292; F04B 39/02; F04B 27/02; F04B 53/18; F04B 53/02; F04B 53/143; F04B 35/04; F04B 7/02; H02K 9/19
USPC ................ 417/368, 369, 370, 372, 415, 418
See application file for complete search history.

(56) References Cited

U.S. PATENT DOCUMENTS

| RE17,457 | E | * | 10/1929 | Davey et al. | ............ | F04B 39/06 |
| | | | | | | 417/319 |
| 2,031,940 | A | * | 2/1936 | Drysdale | ............... | F25B 31/023 |
| | | | | | | 417/372 |
| 2,124,788 | A | * | 7/1938 | Leman | ..................... | F04B 53/00 |
| | | | | | | 91/191 |
| 2,249,882 | A | * | 7/1941 | Buchanan | ............... | F25B 1/006 |
| | | | | | | 62/505 |
| 2,350,815 | A | * | 6/1944 | Benjamin | ............. | F04B 39/064 |
| | | | | | | 417/254 |

(Continued)

FOREIGN PATENT DOCUMENTS

ES    2438171 T3    1/2014

*Primary Examiner* — Christopher S Bobish

(57) ABSTRACT

A pumping system utilizes a linear actuator to move a shaft attached to two pistons within cylinders to pump a working fluid. A housing is designed with coolant passageways and one-way valves such that movement of the shaft also pumps coolant past cooling fins and over a motor. The shaft is formed of several sections joined by couplers which slide within a bore of the housing. The couplers have a non-round shape and the bore has a complimentary non-round cross section such that rotation of the shaft is prevented.

10 Claims, 3 Drawing Sheets

(56) References Cited

U.S. PATENT DOCUMENTS

| | | | | |
|---|---|---|---|---|
| 2,361,316 | A | * | 10/1944 | John .................. F04B 23/06 417/298 |
| 2,793,089 | A | * | 5/1957 | Anderson ............ F04B 39/042 92/257 |
| 2,862,656 | A | * | 12/1958 | Kadison ................ F04B 27/02 92/79 |
| 3,299,828 | A | * | 1/1967 | Josephian ............ F04B 53/164 417/569 |
| 3,465,953 | A | * | 9/1969 | Shaw .................... F25B 31/002 417/368 |
| 3,657,973 | A | * | 4/1972 | Wahrenberger ......... F04B 37/12 92/166 |
| 3,771,918 | A | | 11/1973 | Winter |
| 3,884,597 | A | * | 5/1975 | Ito .......................... F04B 23/06 417/284 |
| 4,976,591 | A | * | 12/1990 | Rivas ...................... F04B 25/02 417/228 |
| 6,074,170 | A | | 6/2000 | Bert et al. |
| 6,688,431 | B2 | * | 2/2004 | Oh ........................ F04B 35/045 184/6.16 |
| 7,052,250 | B2 | * | 5/2006 | Miura .................. F04B 25/005 417/254 |
| 8,789,601 | B2 | | 7/2014 | Broussard et al. |
| 9,103,193 | B2 | | 8/2015 | Coli et al. |
| 9,140,110 | B2 | | 9/2015 | Coli et al. |
| 9,562,420 | B2 | | 2/2017 | Morris et al. |
| 9,784,265 | B2 | | 10/2017 | Hines et al. |
| 10,352,443 | B2 | * | 7/2019 | Kabir ........................ F16C 5/00 |
| 2006/0108880 | A1 | * | 5/2006 | Lee ........................ F04B 39/064 310/14 |
| 2007/0134108 | A1 | * | 6/2007 | Her ........................ F04B 35/045 417/417 |
| 2008/0310977 | A1 | * | 12/2008 | Moreira .................. F04B 35/04 417/415 |
| 2009/0175743 | A1 | * | 7/2009 | Sakamoto ............... F04B 53/22 417/415 |
| 2010/0221128 | A1 | * | 9/2010 | Mellar .................... F04B 39/06 417/410.1 |
| 2015/0322937 | A1 | * | 11/2015 | Hritz .................. F04B 39/0094 417/53 |
| 2018/0306179 | A1 | * | 10/2018 | Hembree ................ F04B 53/14 |
| 2018/0363436 | A1 | | 12/2018 | Coli et al. |
| 2020/0040882 | A1 | * | 2/2020 | Kalmari .................. F04B 41/06 |
| 2020/0408302 | A1 | * | 12/2020 | Kanei ................... F04B 53/164 |

* cited by examiner

LINEAR ACTUATOR PUMPING SYSTEM

TECHNICAL FIELD

The present disclosure applies to a fluid pumping system. More particularly, the disclosure applies to a pumping system which circulates cooling fluid in addition to pumping a working fluid.

BACKGROUND

The practice of fracking has greatly increased the amount of oil and natural gas produced within the United States. Fracking involves pumping large quantities of fluid into wells. Conventionally, this is accomplished by reciprocating pumps driven by diesel engines. Due to the availability of natural gas on site, it would be preferable to use electric power from natural gas turbine driven generators.

Conventional fracking pumps utilize a crankshaft and connecting rod mechanism to convert rotational motion into axial reciprocating motion of a piston. Each cycle of the piston produces a pulse of flow, with the flow rate during each pulse being a function of the crankshaft and connecting rod geometry. Use of a large number of pistons with offset pulses allows the total flow rate to be smoothed out, but never completely constant. The variations in flow rate are called flow ripple. Flow ripple causes pressure pulses that increase failure rates of various components in the system. Also, for a given system size, such a pump has a very limited stroke distance. Therefore, many strokes per unit time are required to achieve a desired flow rate. This increases wear on valves which must open and close once per stroke.

SUMMARY

A pumping system includes a first housing, a shaft, first and second seals, and first and second one-way valves. The first housing has cooling fins and defines a first passageway proximate the cooling fins. The first housing also defines a second passageway fluidly connected to a sump. The first housing also defining a first bore such that the first and second passageways are fluidly connected to the first bore. The shaft is supported to slide within the first bore in response to activation of a motor. The first seal and second seals are located between the first housing and the shaft and define a first chamber having a first volume that varies based on an axial position of the shaft. The first sliding seal is axially fixed to the first housing. The second sliding seal is axially fixed to the shaft. The first one-way valve is configured to prevent flow from the first passageway to the first chamber such that axial movement of the shaft in a first direction increases the first volume and draws a coolant from the sump, through the second passageway, and into the first chamber. The second one-way valve is configured to prevent flow from the first chamber to the second passageway such that axial movement of the shaft in a second direction decreases the first volume and forces the coolant through the first passageway, past the cooling fins, past the motor to cool the motor, and back to the sump. The pumping system may also include a first cylinder, a first piston, and third and fourth one-way valves. The first cylinder may be fixed to the first housing. The first piston may be slidably supported within the first cylinder and fixed to the shaft. The third valve may be configured to permit flow of a fluid other than the coolant into the first cylinder in response to movement of the shaft in the first direction. The fourth valve may be configured to permit flow of the fluid from the first cylinder in response to movement of the shaft in the second direction. The pumping system may also include a second housing, third and fourth seals, and fifth and sixth one-way valves. The second housing may define third and fourth passageways and a second bore. The fourth passageway may fluidly connect to the sump. The third and fourth passageways may fluidly connect to the second bore. The shaft may be supported to slide within the second bore in response to activation of the motor. The third and fourth seal may be between the second housing and the shaft defining a second chamber having a second volume that varies based on the axial position of the shaft. The third seal may be axially fixed to the second housing. The fourth seal may be axially fixed to the shaft. The fifth one-way valve may be configured to prevent flow from the third passageway to the second chamber such that axial movement of the shaft in the second direction increases the second volume and draws the coolant from the sump, through the fourth passageway, and into the second chamber. The sixth one-way valve may be configured to prevent flow from the second chamber to the fourth passageway such that axial movement of the shaft in the first direction decreases the second volume and forces the coolant through the third passageway, past the motor to cool the motor, and back to the sump. The pumping system may also include a second cylinder, a second piston, and seventh and eighth valves. The second cylinder may be fixed to the second housing. The second piston may be slidably supported within the second cylinder and fixed to the shaft. The seventh valve may be configured to permit flow of the fluid into the second cylinder in response to movement of the shaft in the second direction. The eighth valve may be configured to permit flow of the fluid from the second cylinder in response to movement of the shaft in the first direction. The first housing and the second housing may be identical. The shaft may have a first section extending from the second seal through the first seal and a second section extending from the second seal away from the first seal, wherein second section is threaded, and the motor drives the second section via a screw drive mechanism. The first bore may have a non-round cross section. The first section and the second section of the shaft may be joined by a coupler having a shape that is complementary to the shape of the first bore cross-section to prevent rotation of the shaft with respect to the first housing.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
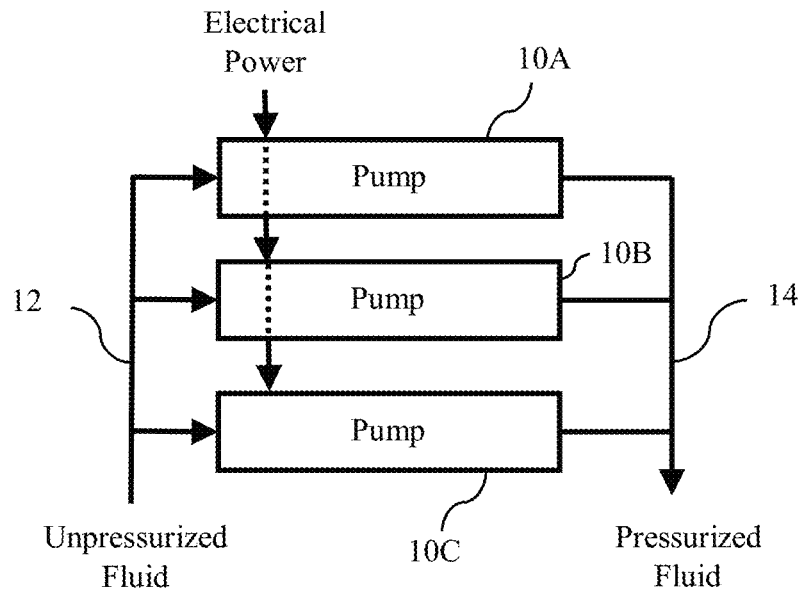
FIG. 1 is a schematic diagram of a pumping system with three pumping units.

FIG. 1 schematically illustrates an electric linear-actuator pumping system. The pumping system uses three pumping units 10A, 10B, and 10C. The number of pumping units may vary. The structure of each pumping unit is described in detail below. Each pumping unit uses electrical power to draw a fluid from a source of unpressurized fluid 12 and deliver the fluid at increased pressure to a fluid outlet 14.

Figure 2:
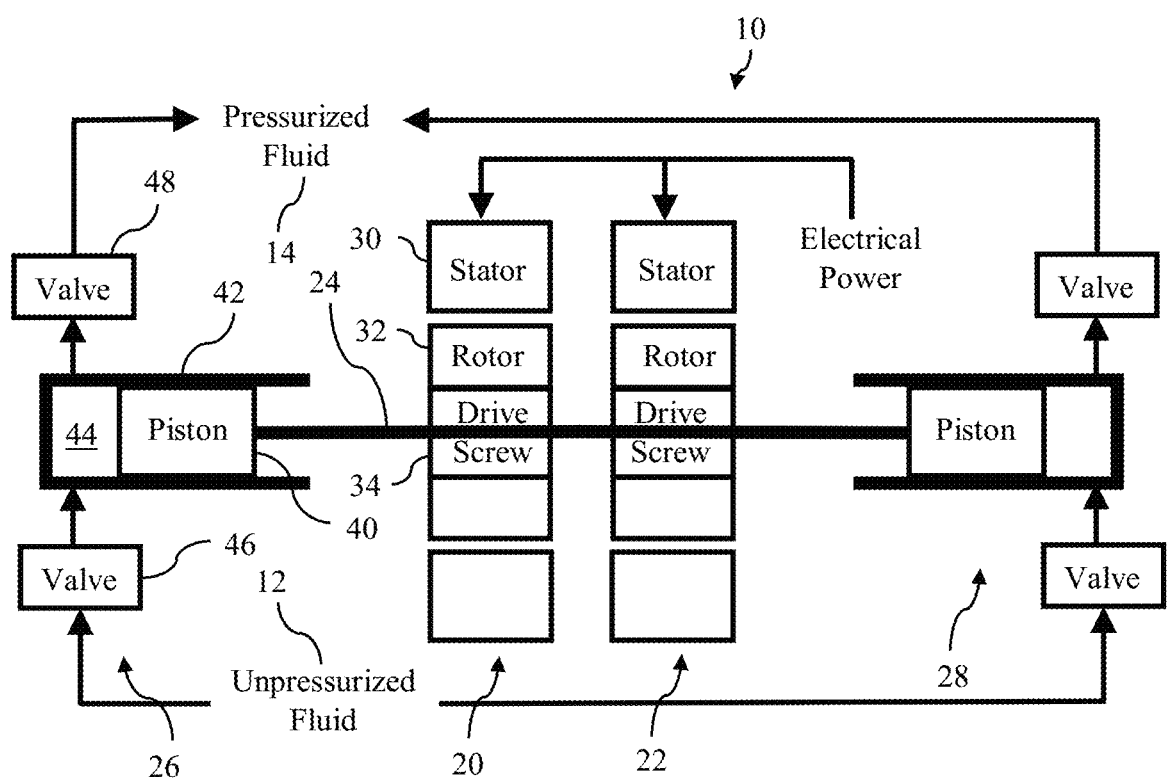
FIG. 2 is a schematic diagram of a linear actuator-based pumping unit suitable for use in the pumping system of FIG. 1.

FIG. 2 schematically illustrates the internal structure of each of the pumping units 10A, 10B, and 10C. Each pumping unit includes two electric linear actuators 20 and 22 which utilize electrical power to translate a shaft 24. The shaft 24 may be hollow to reduce weight. The specific number of electric linear actuators may vary depending on the required force on shaft 24. Pumping chambers 26 and 28 are located at opposite ends of shaft 24. Each pumping chamber draws fluid from the source of unpressured fluid 12 when the shaft is moving in one direction and delivers pressurized fluid to the output 14 when the shaft is moving the opposite direction. The two pumping chambers 26 and 28 are arranged such that one is drawing in unpressurized fluid while the other is expelling pressurized fluid.

Each electric linear actuator 20 and 22 includes an electric motor having a fixed stator 30 and a rotatable rotor 32. Electric power is provided to windings of the stator 30, creating magnetic forces that exert torque on rotor 32. The motor may be, for example, an alternating current motor such as a permanent magnet synchronous motor. With a synchronous alternating current motor, the rotational speed of the rotor is adjusted by adjusting the frequency of the electric current using an inverter. With other types of motors, a speed or position feedback signal may be required. The rotor 32 is fixedly coupled to a nut 34 of a planetary screw drive mechanism as described, for example, in U.S. Pat. No. 9,267,588. The nut 34 of the screw drive mechanism engages external threads of shaft 24. Rotation of nut 34 in response to rotation of rotor 32 causes shaft 24 to displace along its axis.

A piston 40 is attached to each end of shaft 24. The piston slides within a cylinder 42. A volume 44 is defined between the piston 40 and a closed end of the cylinder 42. This volume increases as the piston moves away from the closed end of the cylinder and decreases as the piston moves toward the closed end of the cylinder. When the volume is increasing, valve 46 is open to allow unpressurized fluid to flow into the volume and valve 48 is closed to isolate the pressurized outlet from the volume. Movement of the piston creates a vacuum in the cylinder and atmospheric pressure forces the unpressurized fluid into that space. In some embodiments, the inlet fluid may be slightly pressurized. When the volume is decreasing, the axial force exerted on the shaft 24 is transmitted to the fluid in the volume to pressurize the volume. Valve 48 is open to allow the pressurized fluid to flow to the outlet. Valve 46 is closed to prevent the pressurized fluid from flowing back toward the inlet. Valves 46 and 48 may be, for example, passive check valves.

A control unit continually monitors a control signal or multiple control signals from a sitewide controller which controls multiple pumping systems. These signals indicate a desired flow rate and pressure from the pumping system. The controller calculates a trapezoidal motion profile for each actuator unit in the local pump system, the sum of which meets the demand. The controller utilizes various types of feedback signals which may include: back-emf voltage from the motors, current supplied to the motors, linear position sensors attached to the reciprocating portion of the pumps, rotary position sensors on the integrated nuts, pressure sensors in the fluid chambers of the pumps, strain sensors on the load-bearing elements of the pumps, and condition monitoring sensors in the bearings. The controller adjusts the motion of each actuator's motors to achieve: close adherence to the commanded motion profile, even sharing of torque load on each motor within an actuator unit, and protection from damaging conditions such as cavitation, low pressure, and incomplete fillage. The controller adjusts the motion profiles of each actuator unit in the local group to achieve: even wear and maximum life of each unit, real-time compensation for flow ripple (as discussed below), and special operating conditions as instructed by sitewide controller such as: pulsation or shockwave generation, ramp up/down, and/or idle. The controller relays real-time operating parameters (position, velocity, status) to the sitewide controller.

Figure 3:
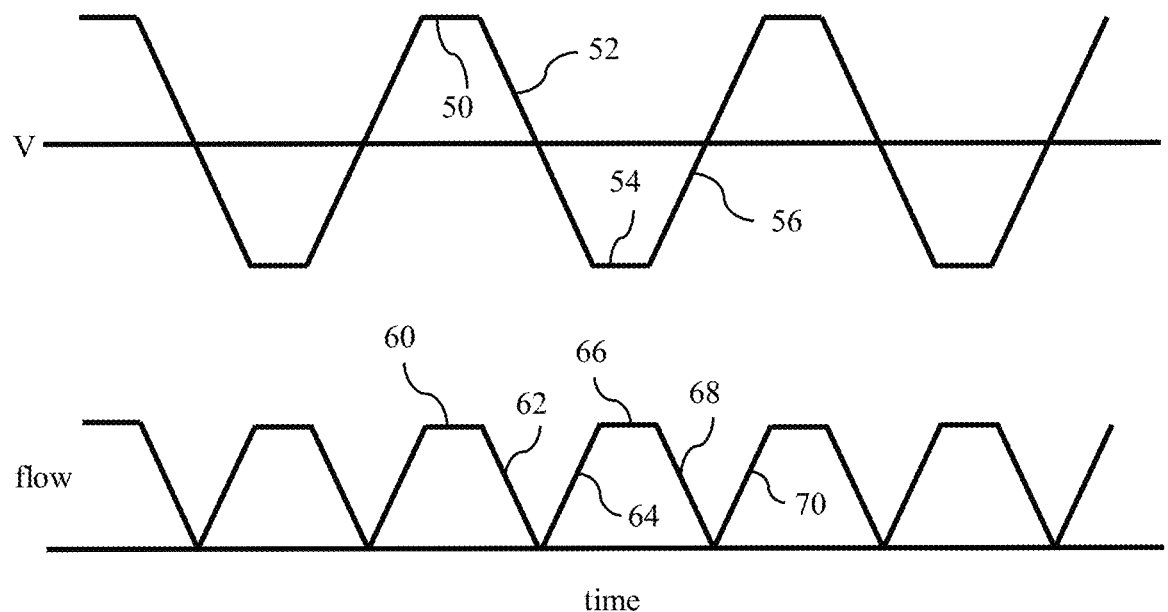
FIG. 3 is a graphical representation of the speed and flow rate of a pumping unit when operated such that the total flow for the pumping system is constant.

The top portion of FIG. 3 illustrates the velocity of shaft 24 as a function of time. During a first phase 50, the shaft moves in a positive direction at a steady speed. During a second phase 52, the shaft slows down at a steady rate. During the middle of the second phase, the shaft changes direction. During a third phase 54, the shaft moves in a negative direction at a steady speed, which is equal in magnitude to the speed of the first phase. Finally, during a fourth phase 56, the shaft accelerates at a steady rate equal to the rate of deceleration of the second phase. At the end of the fourth phase, the shaft has returned to its original position and speed and the process is repeated.

The bottom portion of FIG. 3 illustrates the fluid flow rate as a function of time. Note that the flow rate is proportional to the absolute value of the velocity. When the shaft is moving in a forward direction, flow is provided to the outlet from one of the pumping chambers. When the shaft is moving in a negative direction, flow is provided by the other pumping chamber. During the first phase 50, a constant flow rate 60 is provided by pumping chamber 26. During the first half of the second phase 52, the flow rate from pumping chamber 26 decreases to zero as shown at 62. During the second half of phase 52, the flow rate from pumping chamber 24 increases as shown at 64. During the third phase 54, a constant flow rate 66 is provided by pumping chamber 24. During the first half of the fourth phase 56, the flow rate from pumping chamber 24 decreases to zero as shown at 68. During the second half of phase 56, the flow rate from pumping chamber 26 increases as shown at 70.

With three pumping units, these phases are staggered to maintain constant total flow. At any given time, one pumping unit is operating in either phase 60 or 66, another pumping unit is operating in either phase 62 or 68, and a third pumping unit is operating in either phase 64 or 70. With three total pumping units, the length of phase 50 and 54 should be half as long as the length of phases 52 and 56. With different numbers of pumping units, the relative durations of the phases may be adjusted such that one unit is always in a declining flow phase and one unit is always in an increasing flow phase.

In addition to establishing a constant flow rate, the pumping system described above offers several advantages. Each of the pumping units has a relatively long stroke relative to its overall size. As a result, the valves do not need to open and close as often as they would for a shorter stroke pump at the same average flow rate. This improves the durability of the valves. Furthermore, the pumping system can continue to operate with one of the pumping units offline which simplifies maintenance.

Figure 4:
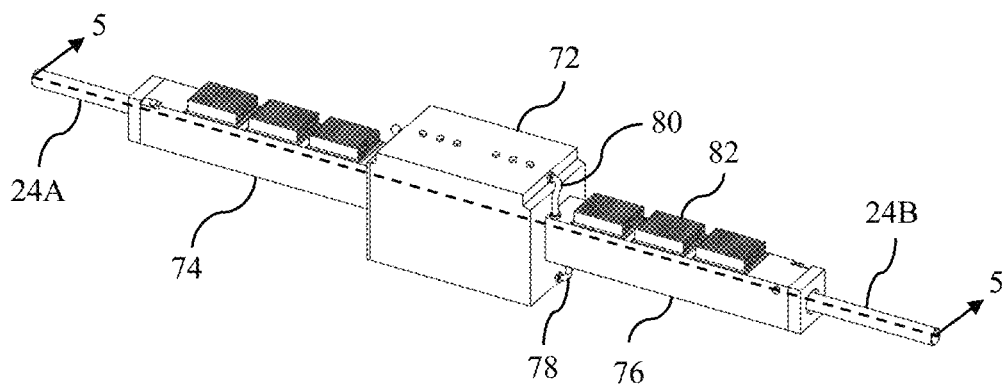
FIG. 4 is a pictorial view of the pumping unit of FIG. 2.

FIG. 4 is a pictorial view of one of the pumping units 10 prior to installation of the pumping chambers 26 and 28. A central housing 72 houses the electric motors and screw drive nuts. Side housings 74 and 76 attach to each side of central housing 72. As discussed in detail below, the side housings circulate a coolant from coolant return lines 78 to coolant supply lines 80, providing cooling and lubrication to the motors and the screw drive mechanism. Cooling fins 82 dissipate heat from the side housings to the surrounding air.

Figure 5:
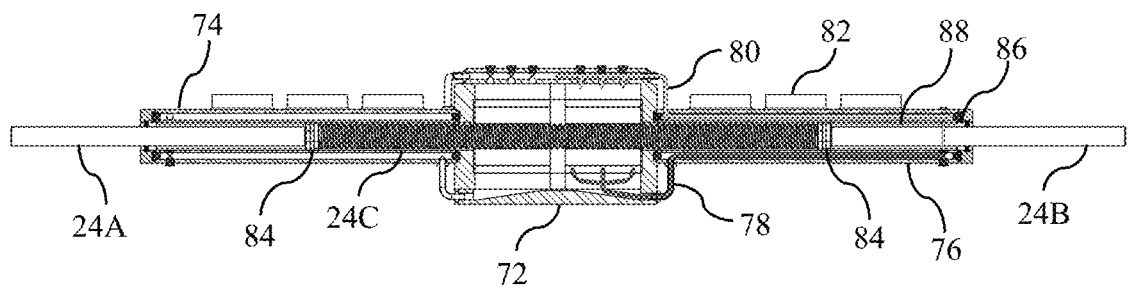
FIG. 5 is a cross-sectional view of the pumping unit of FIG. 4.

FIG. 5 is a cross sectional view of the pumping unit of FIG. 4. Shaft 24 includes three shaft sections: left end portion 24A, threaded portion 24C, and right end portion 24B. The end portions 24A and 24B are joined to the threaded portion 24C by couplers 84. Each coupler has a non-circular cross-sectional shape, such as a diamond or oval shape, that fits sealingly and slidably into an interior surface of side housing 74 and 76 respectively. The non-circular shape prevents rotation of the threaded portion 24C with respect to the housing, but permits axial motion. Seals 86 surrounds each end portion 24A and 24B and are fixed to the corresponding side housing to facilitate a sliding seal for the moving end portions 24A, 24B.

Figure 6:
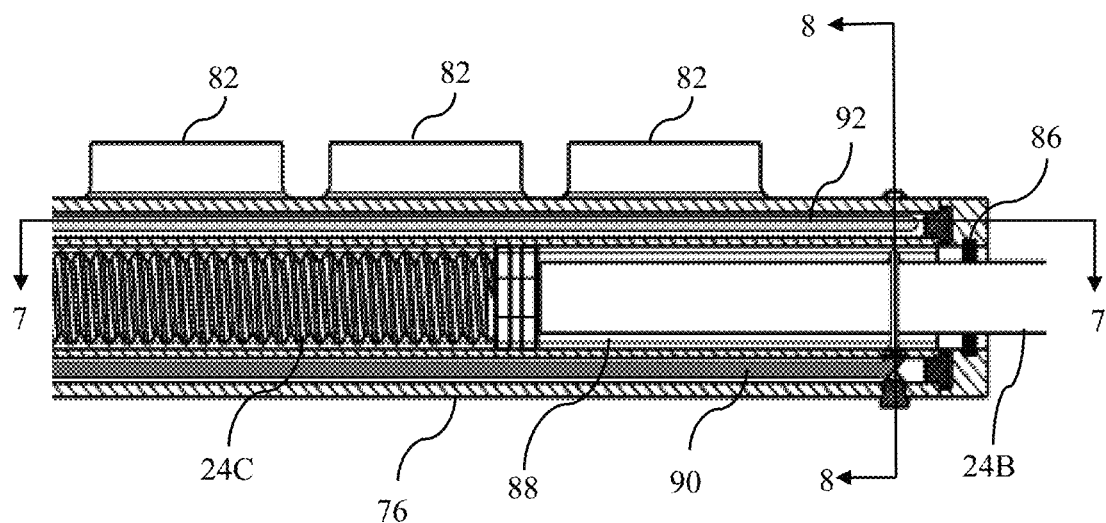
FIG. 6 is a detail cross-sectional view of the pumping unit of FIG. 5.

FIG. 6 is a detailed view of the right hand-side of the pumping unit cross-section of FIG. 5. A chamber 88 is formed between the interior surface of the side housing, the end portion, the coupler 84, and the seal 86. The volume of this chamber varies depending on the axial location of the shaft 24. As the shaft 24 moves to the left, coolant is drawn from a sump in the central housing, through return line 78, through a first passageway 90 in side housing 76, through a first one-way valve, and into chamber 88. As shaft 24 moves to the right, the coolant is pushed from chamber 88, through a second one-way valve, through a second passageway 92, through supply line 80, into the top of central housing 72, where it is dispersed and flows by gravity around the motor. As the coolant flows through the second passageway, it flows past the cooling fins 82 and transfers heat to the cooling fins.

Figure 7:
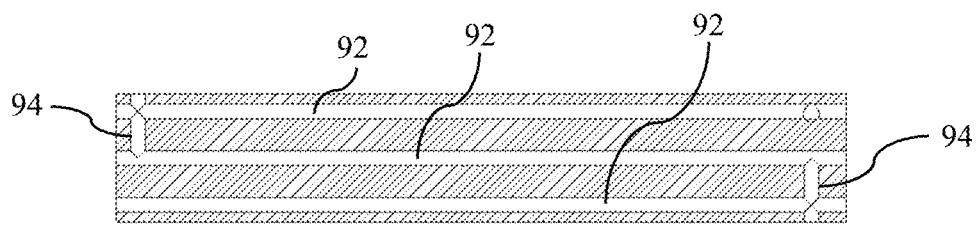
FIG. 7 is a top cross-sectional view of a side housing of the pumping unit of FIG. 5.
Figure 8:
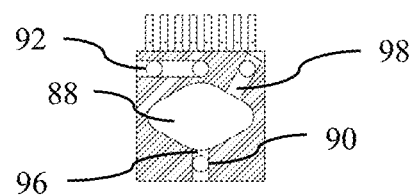
FIG. 8 is an end cross-sectional view of a side housing of the pumping unit of FIG. 5.

FIGS. 7 and 8 are cross-sections of right side housing 76 from the top and from the end respectively. Note that passageway 92 includes several axial holes connected by transfer holes 94. The ends of most of the holes are plugged. This pattern forced the fluid to run back and forth across the top of the housing, adjacent to the cooling fins, several times. Passageways 90 and 92 are connected to chamber 88 near the end farthest from the central housing. First one-way valve 96 ensures that fluid does not flow out through passageway 90 while the volume of chamber 88 is decreasing. Second one-way valve 98 ensures that fluid does not flow into passageway 92 while the volume of chamber 88 in increasing.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A pumping system comprising:
   a first housing having cooling fins, defining a first passageway proximate the cooling fins, defining a second passageway fluidly connected to a sump, and defining a first bore, the first and second passageways fluidly connected to the first bore;
   a shaft supported to slide within the first bore in response to activation of a motor;
   a first sliding seal between the first housing and the shaft axially fixed to the first housing;
   a second sliding seal between the first housing and the shaft axially fixed to the shaft, thereby defining a first chamber within the first bore, the first chamber having a first volume that varies based on an axial position of the shaft;
   a first one-way valve configured to prevent flow from the first passageway to the first chamber such that axial movement of the shaft in a first direction increases the first volume and draws a coolant from the sump, through the second passageway, and into the first chamber;
   a second one-way valve configured to prevent flow from the first chamber to the second passageway such that axial movement of the shaft in a second direction decreases the first volume and forces the coolant through the first passageway, past the cooling fins, past the motor to cool the motor, and back to the sump;
   a first cylinder fixed to the first housing;
   a first piston slidably supported within the first cylinder and fixed to the shaft;
   a third valve configured to permit flow of the fluid other than the coolant into the first cylinder in response to movement of the shaft in the first direction; and a fourth valve configured to permit flow of the fluid from the first cylinder in response to movement of the shaft in the second direction.

2. The pumping system of claim 1 further comprising:
a second housing defining a third passageway, defining a fourth passageway fluidly connected to the sump, and defining a second bore, the third and fourth passageways fluidly connected to the second bore, the shaft supported to slide within the second bore in response to activation of the motor;
a third seal between the second housing and the shaft axially fixed to the second housing;
a fourth seal between the second housing and the shaft axially fixed to the shaft, thereby defining a second chamber within the second bore, the second chamber having a second volume that varies based on the axial position of the shaft;
a fifth one-way valve configured to prevent flow from the third passageway to the second chamber such that axial movement of the shaft in the second direction increases the second volume and draws the coolant from the sump, through the fourth passageway, and into the second chamber; and
a sixth one-way valve configured to prevent flow from the second chamber to the fourth passageway such that axial movement of the shaft in the first direction decreases the second volume and forces the coolant through the third passageway, past the motor to cool the motor, and back to the sump.

3. The pumping system of claim 2 further comprising:
a second cylinder fixed to the second housing;
a second piston slidably supported within the second cylinder and fixed to the shaft;
a seventh valve configured to permit flow of the fluid into the second cylinder in response to movement of the shaft in the second direction; and
an eighth valve configured to permit flow of the fluid from the second cylinder in response to movement of the shaft in the first direction.

4. The pumping system of claim 2 wherein the first housing and the second housing are identical.

5. A pumping system comprising:
a central housing having a sump;
left and right side housings fixed to the central housing, each side housing having cooling fins and defining a bore and first and second passageways, each first passageway fluidly connecting the sump to the respective bore, each second passageway being proximate the respective cooling fins and fluidly connecting the respective bore to a top end of the central housing;
a shaft extending through the central housing and through the bores of each side housing;
a motor located in the central housing and configured to move the shaft axially;
two end sliding seals between shaft and each of the side housings, the end seals axially fixed to the side housings;
two middle sliding seals between the shaft and each of the side housings, the middle seals axially fixed to the shaft, thereby defining first chambers within the respective bore, the first chambers having respective first volumes that vary based on an axial position of the shaft; and
a set of one-way valves configured such that
axial movement of the shaft towards the right side housing draws coolant from the sump, through the first passageway of the left side housing, into the bore of the left side housing and propels coolant from the bore of right side housing, through the second passageway of the right side housing, and across the motor back to the sump, and
axial movement of the shaft towards the left side housing draws coolant from the sump, through the first passageway of the right side housing, into the bore of the right side housing and propels coolant from the bore of left side housing, through the second passageway of the left side housing, and across the motor back to the sump.

6. The pumping system of claim 5 further comprising:
left and right cylinders fixed to the left and right side housings, respectively;
left and right pistons slidably supported within the left and right cylinders, respectively, fixed to left and right ends of the shaft, respectively; and
a second set of valves configured such that
axial movement of the shaft towards the right side housing draws a working fluid into the left cylinder and propels the working fluid from the right cylinder, and
axial movement of the shaft towards the left side housing draws the working fluid into the right cylinder and propels the working fluid from the left cylinder.

7. The pumping system of claim 5 wherein a section of the shaft between the middle seals is threaded, and the motor drives the shaft via a screw drive mechanism.

8. The pumping system of claim 7 wherein the bores have a non-round cross section, and wherein the middle seals have a shape that is complementary to the shape of the bore cross-section thereby preventing rotation of the shaft with respect to the housings.

9. A pumping system comprising:
a first housing having cooling fins, defining a first passageway proximate the cooling fins, defining a second passageway fluidly connected to a sump, and defining a first bore, the first and second passageways fluidly connected to the first bore;
a shaft supported to slide within the first bore in response to activation of a motor;
a first sliding seal between the first housing and the shaft axially fixed to the first housing;
a second sliding seal between the first housing and the shaft axially fixed to the shaft, thereby defining a first chamber within the first bore, the first chamber having a first volume that varies based on an axial position of the shaft;
a first one-way valve configured to prevent flow from the first passageway to the first chamber such that axial movement of the shaft in a first direction increases the first volume and draws a coolant from the sump, through the second passageway, and into the first chamber;
a second one-way valve configured to prevent flow from the first chamber to the second passageway such that axial movement of the shaft in a second direction decreases the first volume and forces the coolant through the first passageway, past the cooling fins, past the motor to cool the motor, and back to the sump; and
the shaft has a first section extending from the second sliding seal through the first sliding seal and a second section extending from the second sliding seal away from the first sliding seal, wherein the second section is threaded, and the motor drives the second section via a screw drive mechanism.

10. The pumping system of claim 9 wherein the first bore has a non-round cross section, and wherein the first section and the second section of the shaft are joined by a coupler having a shape that is complementary to the shape of the non-round cross-section thereby preventing rotation of the shaft with respect to the first housing.

\* \* \* \* \*